United States Patent [19]
Bunde

[11] Patent Number: 5,838,861
[45] Date of Patent: Nov. 17, 1998

[54] TRANSITION ASSEMBLY FOR OPTICAL FIBER

[75] Inventor: Todd A. Bunde, Newport News, Va.

[73] Assignee: Newport News Shipbuilding and Dry Dock Company, Newport News, Va.

[21] Appl. No.: 891,595

[22] Filed: Jul. 11, 1997

Related U.S. Application Data

[60] Provisional application No. 60/040,497, Mar. 6, 1997.

[51] Int. Cl.$^6$ ..................................................... G02B 6/44
[52] U.S. Cl. ........................... 385/100; 385/101; 385/106
[58] Field of Search ........................... 385/100–114, 115, 385/116, 62, 81

[56] References Cited

U.S. PATENT DOCUMENTS

| | | | |
|---|---|---|---|
| 4,626,067 | 12/1986 | Watson | 350/96.23 |
| 4,691,896 | 9/1987 | Reeve et al. | 254/134.4 |
| 4,796,970 | 1/1989 | Reeve et al. | 350/96.23 |
| 4,826,277 | 5/1989 | Weber et al. | 350/96.23 |
| 4,948,097 | 8/1990 | Reeve et al. | 254/134.4 |
| 5,247,599 | 9/1993 | Vyas et al. | 385/113 |
| 5,267,338 | 11/1993 | Bullock et al. | 385/100 |

*Primary Examiner*—Phan T. H. Palmer
*Attorney, Agent, or Firm*—Joy L. Bryant

[57] ABSTRACT

The transition assembly of the present invention comprises a pneumatic tube which has a longitudinal axis, an entrance end, an exit end, an interior surface and an exterior surface. The entrance end of a furcation tube assembly is placed in an operable relationship to the exit end of the pneumatic tube. The furcation tube assembly comprises at least one furcation tube. The furcation tube has an inner tube, a fibrous sheath surrounding the inner tube, and an outer sheath surrounding the fibrous sheath. At least one furcation tube extends from the entrance end of the furcation tube assembly. The furcation tube has a length of the outer sheath removed to expose the inner tube and the fibrous sheath. The exposed inner tube is disposed within the exit end of the pneumatic tube; extends along the longitudinal axis of the pneumatic tube; and protrudes from the entrance end of the pneumatic tube. A fastener attaches the entrance end of the furcation tube assembly to the exit end of the pneumatic tube.

26 Claims, 5 Drawing Sheets

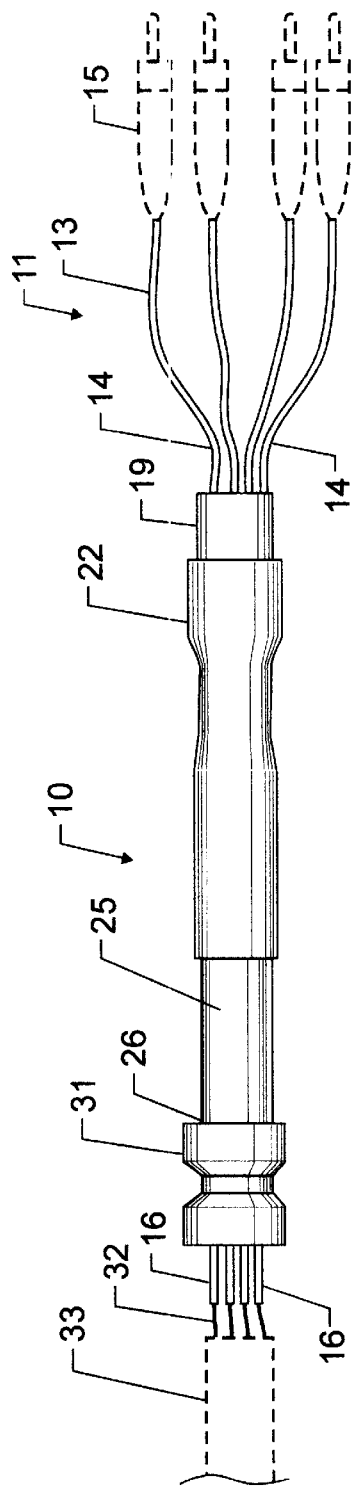
FIG. 1
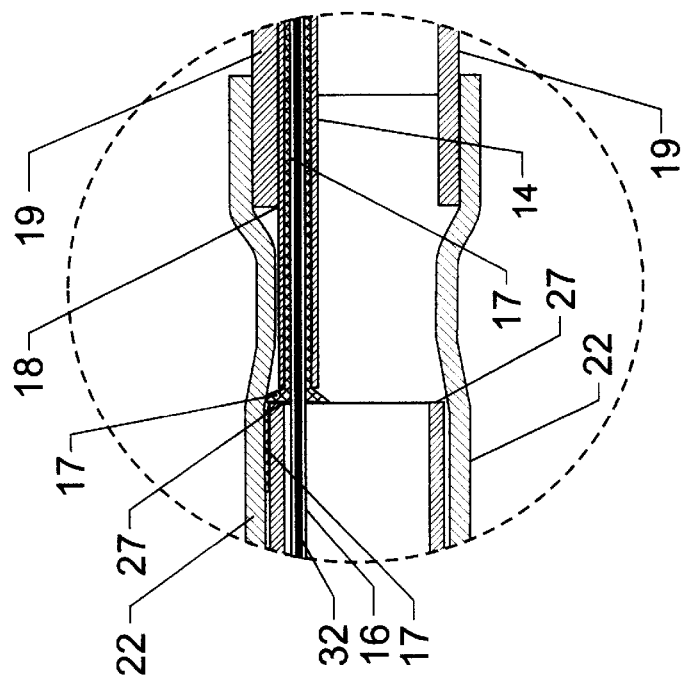
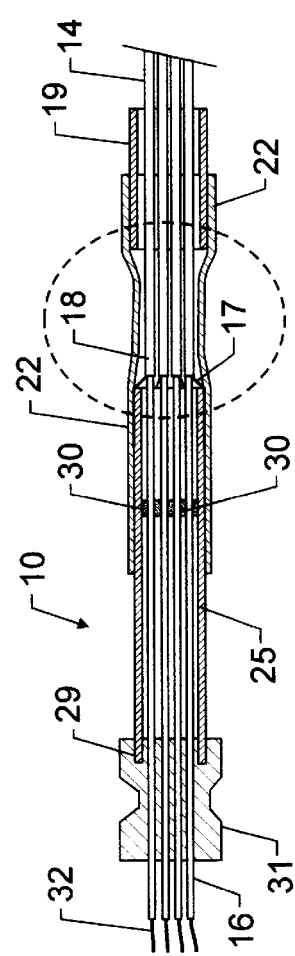
FIG. 2

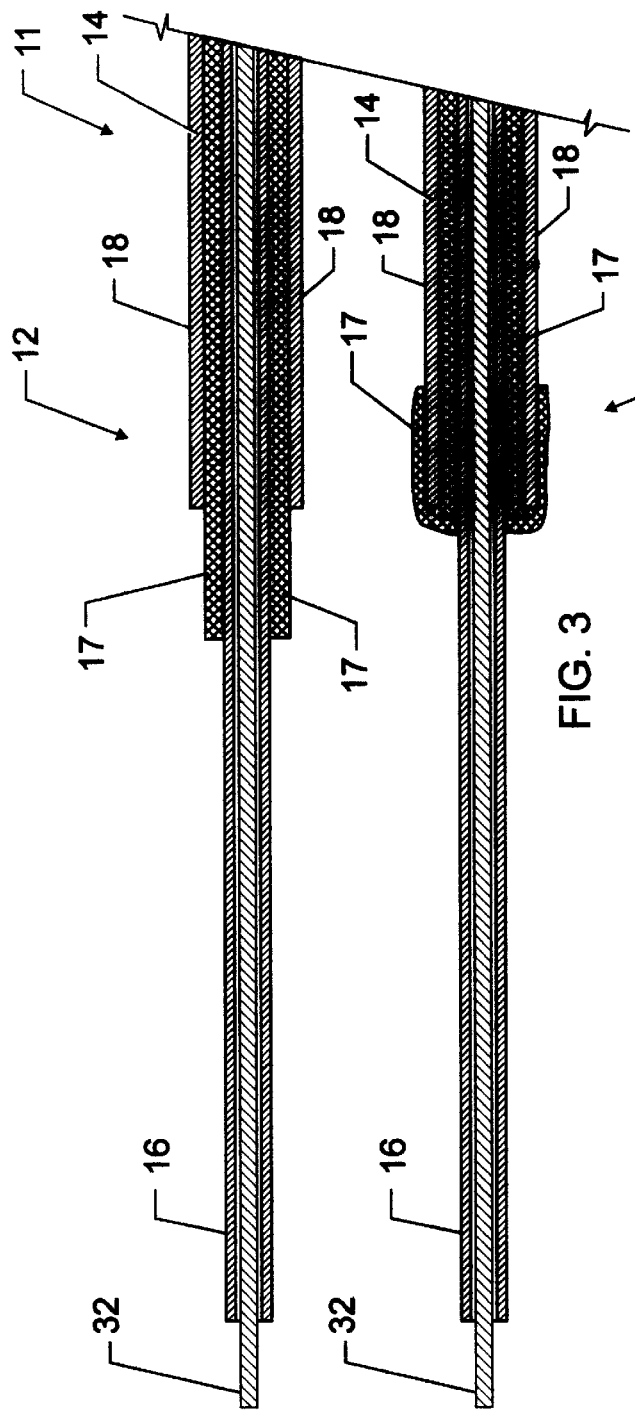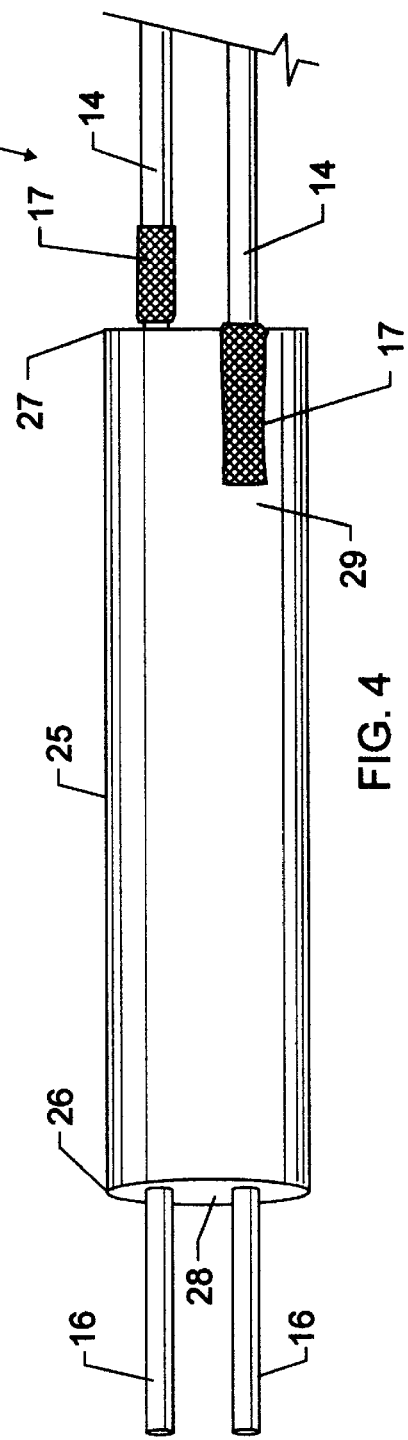

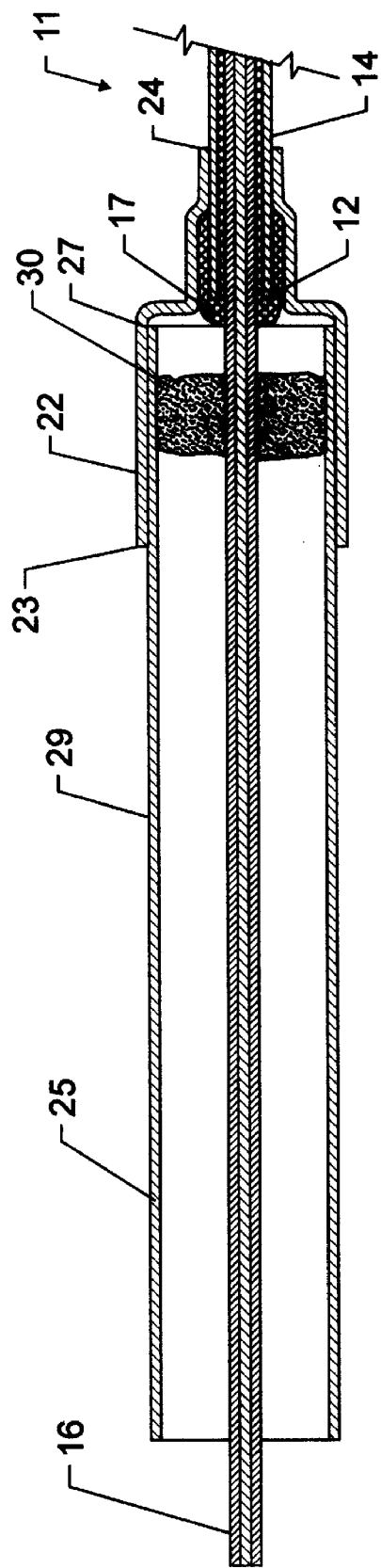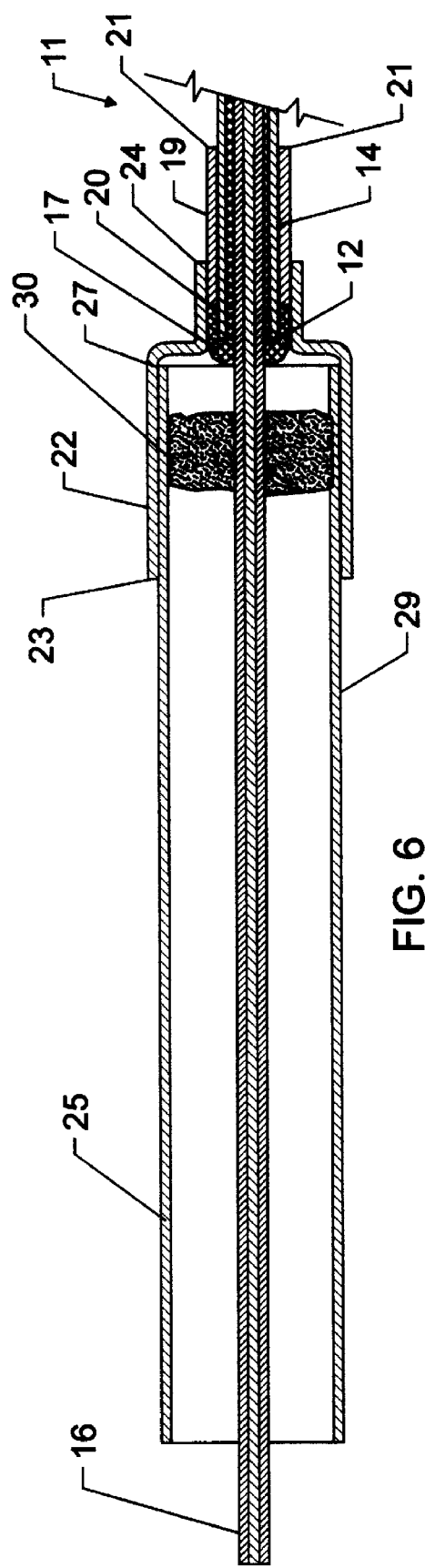

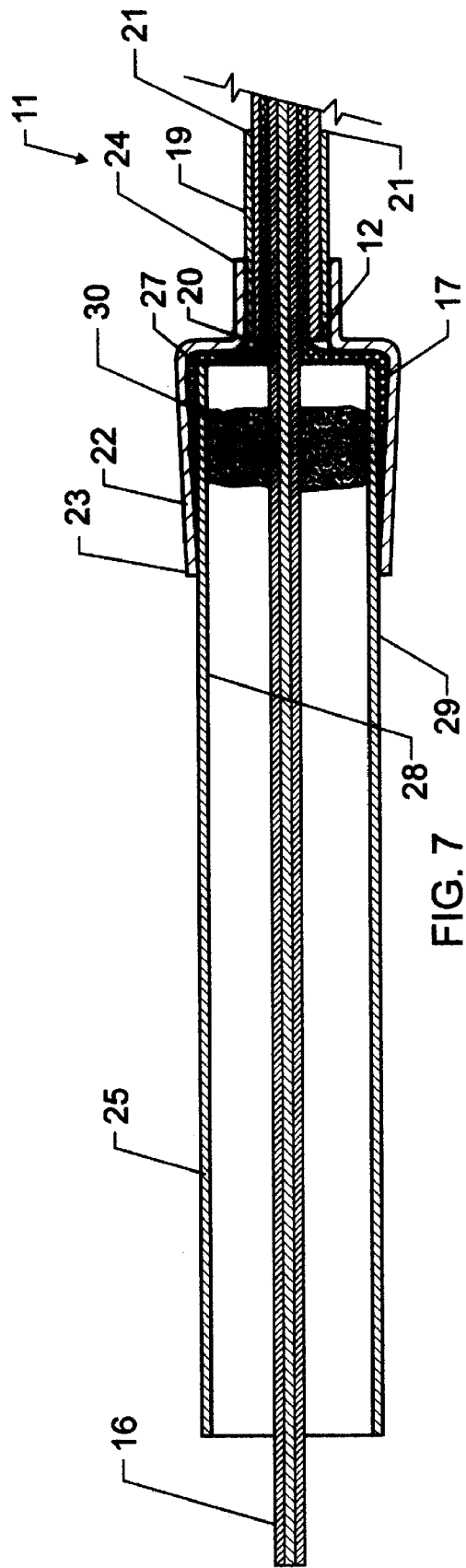

TRANSITION ASSEMBLY FOR OPTICAL FIBER

CROSS-REFERENCE TO RELATED APPLICATIONS

This application claims the benefit of U.S. Provisional Application No. 60/040,497 filed Mar. 6, 1997.

FIELD OF THE INVENTION

The present invention relates to a transition assembly and method for optical fiber. In particular, it relates to transitioning from at least one optical fiber to a connector.

BACKGROUND OF THE INVENTION

In many instances, optical fibers provide superior signal transmission to electrical signal transmission. In particular, optical fibers are useful for transmitting distortion-free signals over short or intermediate distances in locations where the concentration of electrical transmission is substantial creating significant electrical flux that interferes with good electrical signal transmission.

Optical fiber cables carrying optical fiber transmission lines have traditionally been installed using methods which were used for metal conductor cables. These methods involved pulling the cable with a pulling rope through a previously laid cable duct. This method, although viable for metal conductor cables, has proven to be harmful to optical fibers which are easily damaged by tensile stress.

In turn, a less damaging method for installing optical fiber was developed by Reeve et al. and is described in U.S. Pat. No. 4,691,896; U.S. Pat. No. 4,796,970; and U.S. Pat. No. 4,948,097. In their method, a lightweight and flexible optical fiber member is advanced along a tubular pathway by fluid drag of a gaseous medium passed through the pathway in the desired direction of advance. A conduit comprising a plurality of individual tubes enveloped by a common outer sheath is used to route individual fibers through the conduit. The individual fibers exit the conduit through the individual tubes. This blown in method provides a means to accurately and economically install, remove and reconfigure the optical fiber cable architecture with minimal damage to the fiber optic cable.

At the cable terminus, the individual fibers are "broken out" of the cable, that is freed from the outer jacket, and terminated by connecting them to light signal producing or receiving apparatus, e.g., light emitting diodes or optical detectors. For a multi-fiber cable, the outer jacket is cut away to allow the buffer tube-protected fibers to be separately connected to optical transmitting or receiving units. The end of each buffer tube is cut back, and the ends of the optical fiber and cut-back buffer tubes are inserted and glued into connectors. The ends of the fibers are polished by conventional means, and the connectors are mated with alignment sleeves which hold the polished optical fiber ends closely adjacent to the optical detecting or transmitting units or in close proximity to the end of a similar optical fiber. The adhesion of the optical fibers to the connectors provided by the glue, e.g., epoxy, is relatively weak, typically providing only about five pounds of pull-out strength. Where human activity is considerable at the breakout location, the fibers may be inadvertently dislodged from the fitting. Even if the fiber is not dislodged, jarring of an optical fiber held only by glue may introduce noise in the optical signal.

Watson in U.S. Pat. No. 4,626,067 proposed a solution to this problem by providing a method of breaking out and terminating optical fiber elements from a multi-fiber cable. In this method, multiple fibers are broken out of multi-fiber cables and sheathed in tubing segments which permit the sheathed fibers to be terminated as single optical fiber conduits. The cable jacket is cut back exposing a plurality of buffer tube-encased optical fibers. The tubing segments, each having a yarn strengthening member extending from both ends, are slipped onto the buffer tubes leaving a slight discontinuity between the end of the jacket and the inner ends of the tubing segments. The yarn strengthening members are wrapped and glued around the buffer tubes in the discontinuity. At the other end, the optical fibers are terminated in a conventional manner in high performance connectors with the strengthening members firmly attached to the connectors. The strengthening members of the tubing segments, attached at one end to the cable and at the other end to the termination connectors, relieve stress on the optical fibers and provide terminations with substantial pull-out strength. This method is time consuming and labor intensive. Care must be taken to insure that the yarn within the tubing segment is cut to the same length as the polymeric tubing. When the tubing segments are slid onto each buffer tube, care must be taken to make sure that the buffer tube does not kink and damage the optical fiber. In addition, it may happen that an end of a buffer tube will hang up on the sliding tubing segment.

Weber et al. in U.S. Pat. No. 4,826,277 proposed an alternative method to transition from a multiple fiber cable to a single fiber cable. The transition is constructed by extending one or more unsheathed optical fibers of a multiple fiber cable from a remainder of the multiple fiber cable. A strain relief means is assembled to an outer sheath and to strength members of the remainder of the multiple fiber cable, and to an outer sheath and to strength members of each of one or more single fiber cables corresponding in number with the number of unsheathed optical fibers. An optical fiber of each single fiber cable is substituted with a corresponding unsheathed optical fiber, whereby each unsheathed optical fiber is assembled with the outer sheath and the strength members of a corresponding single fiber cable. Their invention overcomes difficulties associated with the use of tubing to construct single fiber cables around unsheathed optical fibers.

SUMMARY OF THE INVENTION

By the present invention, a transition assembly for optical fiber is provided. The transition assembly comprises a pneumatic tube; a furcation tube assembly having one or more furcation tubes; and a fastener. The pneumatic tube has a longitudinal axis, an entrance end, an exit end, an interior surface and an exterior surface. The furcation tube assembly has an entrance end and an exit end. The entrance end of the furcation tube assembly is placed in an operable relationship to the exit end of the pneumatic tube and is attached to the pneumatic tube with a fastener. The furcation tube assembly comprises at least one furcation tube. Each furcation tube has an inner tube; a fibrous sheath, preferably prepared from a polyamide fiber, surrounding the inner tube; and an outer sheath surrounding the fibrous sheath. At least one furcation tube extends from the entrance end of the furcation tube assembly. Each furcation tube has a length of the outer sheath removed to expose the fibrous sheath and the inner tube. The exposed inner tube is disposed within the exit end of the pneumatic tube, extends along the longitudinal axis of the interior surface of the pneumatic tube, and protrudes from the entrance end of the pneumatic tube.

The fastener of the present invention is any fastener known to those skilled in the art and may be a member selected from the group consisting of: a metal box; a non-adhesive-lined heat shrink tube; an adhesive-lined heat shrink tube; a mechanical fastener; an electrical tape; a glue; a plastic box; and a polymeric adhesive. In one embodiment, the fastener is an adhesive-lined heat shrink tube. The adhesive-lined heat shrink tube has an entrance end and an exit end. The entrance end of the adhesive-lined heat shrink tube overlaps a length of the exterior surface of the exit end of the pneumatic tube. The exit end of the adhesive-lined heat shrink tube overlaps a length or portion of the entrance end of the furcation tube assembly.

In a preferred embodiment, the fastener is an adhesive-lined heat shrink tube which is used in combination with a non-adhesive-lined heat shrink tube. When this combination is used, the non-adhesive-lined heat shrink tube overlaps a length of the furcation tube assembly. The entrance end of the non-adhesive-lined heat shrink tube is disposed within the exit end of the adhesive-lined heat shrink tube and the exit end of the non-adhesive-lined heat shrink tube is left to overlap a length of the furcation tube assembly.

A length of the exposed fibrous sheath is either splayed backward to overlap a length of the furcation tube from which it is originally extending or the exposed fibrous sheath is splayed forward to overlap a length of the exterior surface of the exit end of the pneumatic tube. In either case, an adhesive-lined heat shrink tube bonds the fibrous sheath to the pneumatic tube or to the furcation tube.

A tube seal means for sealing the pneumatic tube may be a part of the transition assembly. The tube seal means seals the inner tube to the interior surface of the pneumatic tube. The tube seal means is selected from the group consisting of: an RTV silicone; a pipe joint compound; a rubber; and a polymer gel. Preferably, the tube seal means is an RTV silicone.

The transition assembly of the present invention may further include a tube connector means for attaching the entrance end of the pneumatic tube to a conduit containing at least one optical fiber. The tube connector means is attached to the exterior surface of the entrance end of the pneumatic tube. Examples of the tube connector means include: a pneumatic connector; a mechanical fastening device; and a plastic-bodied, push-fit pneumatic connector. Preferably, the tube connector means is a plastic-bodied, push-fit pneumatic connector.

When the transition assembly of the present invention is in use, at least one optical fiber extends from a conduit. Each optical fiber is extended through the exposed inner tube which protrudes from the entrance end of the pneumatic tube. The optical fiber is fed through the inner tube along the longitudinal axis of the interior surface of the pneumatic tube, and through the furcation tube assembly to a connector.

The method of the present invention comprises the steps of: providing a furcation tube assembly having an entrance end and an exit end. The furcation tube assembly comprises at least one furcation tube, each furcation tube having an inner tube; a fibrous sheath surrounding the inner tube; and an outer sheath surrounding the fibrous sheath. At least one furcation tube is extended from the entrance end of the furcation tube assembly. The outer sheath is removed from a length of each extended furcation tube to expose the inner tube and the fibrous sheath. A pneumatic tube having an entrance end, an exit end, an interior surface, an exterior surface and a longitudinal axis is also provided. The exposed inner tube is extended through the exit end of the pneumatic tube, along the interior surface and the longitudinal axis of the pneumatic tube, and out of the entrance end of the pneumatic tube. The entrance end of the furcation tube assembly is attached to the exit end of the pneumatic tube. The method further comprises the steps of attaching a tube connector means for attaching the entrance end of the pneumatic tube to a conduit to the exterior surface of the entrance end of the pneumatic tube through which the inner tube extends and applying a tube seal to the interior surface of the pneumatic tube.

BRIEF DESCRIPTION OF THE DRAWINGS

FIG. 3 is a sectional view of the furcation tube assembly.

FIG. 4 is a plan view of a section of the transition assembly depicting how the exposed fibrous sheath may be splayed backward over the furcation tube or how the exposed fibrous sheath may be splayed forward overlapping the exterior surface of the exit end of the pneumatic tube.

FIG. 5 is a sectional view depicting the entrance end of the furcation tube assembly attached to the exit end of the pneumatic tube by an adhesive-lined heat shrink tube and the fibrous sheath is splayed backward onto the furcation tube.

FIG. 6 is a sectional view showing the entrance end of the furcation tube assembly attached to the exit end of the pneumatic tube using a combination of an adhesive-lined heat shrink tube and a non-adhesive-lined heat shrink tube and the fibrous sheath is splayed backward onto the furcation tube.

FIG. 7 is a sectional view depicting the entrance end of the furcation tube assembly attached to the exit end of the pneumatic tube using a combination of an adhesive-lined heat shrink tube and a non-adhesive lined heat shrink tube and the fibrous sheath is splayed forward over the exterior surface of the exit end of the pneumatic tube.

DETAILED DESCRIPTION OF THE INVENTION

Figure 8:
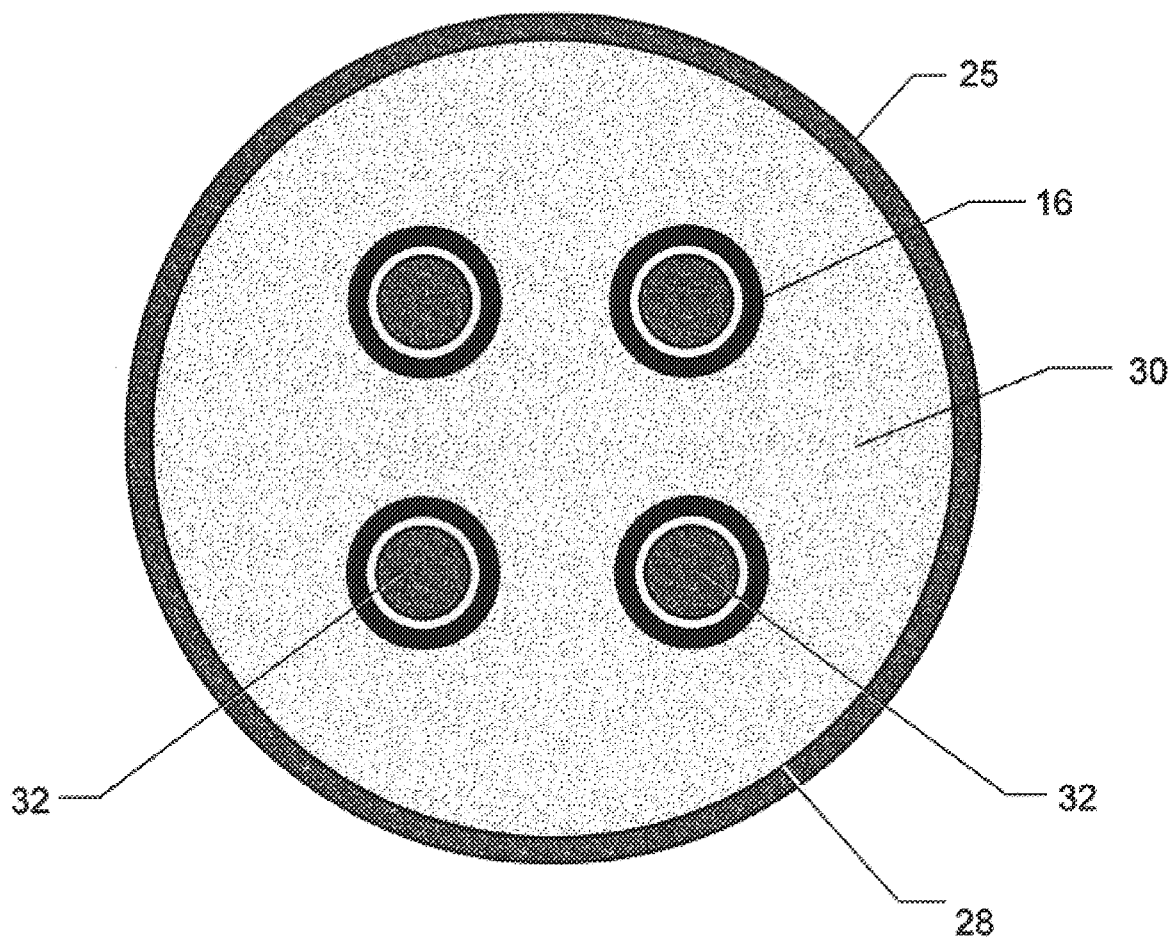
FIG. 8 is a cross-sectional view of the tube-seal means.

One of the main advantages to the transition assembly of the present invention is that it provides an off-the-shelf means for transitioning from a single optical fiber to a connector with minimal field assembly. In turn, the optical fiber experiences a minimal amount of handling once it has been blown into the conduit. One merely threads the optical fiber from the conduit through the assembly. In turn, the chance for damage and breakage is minimal.

To simplify the reading of this specification, the parts of the invention are identified, along with their reference numerals, in Table 1.

TABLE 1

| PART | REFERENCE NUMERAL |
| --- | --- |
| Transition Assembly | 10 |
| Furcation Tube Assembly | 11 |
| Entrance End—Furcation Tube Assembly | 12 |
| Exit End—Furcation Tube Assembly | 13 |
| Furcation Tube | 14 |

TABLE 1-continued

| PART | REFERENCE NUMERAL |
| --- | --- |
| Connector | 15 |
| Inner tube | 16 |
| Fibrous Sheath | 17 |
| Outer Sheath | 18 |
| Non-adhesive Lined Heat Shrink Tube | 19 |
| Entrance End— Non-adhesive Lined Heat Shrink Tube | 20 |
| Exit End— Non-adhesive Lined Heat Shrink Tube | 21 |
| Adhesive-Lined Heat Shrink Tube | 22 |
| Entrance End— Adhesive-Lined Heat Shrink Tube | 23 |
| Exit End— Adhesive-Lined Heat Shrink Tube | 24 |
| Pneumatic Tube | 25 |
| Entrance End— Pneumatic Tube | 26 |
| Exit End— Pneumatic Tube | 27 |
| Interior Surface— Pneumatic Tube | 28 |
| Exterior Surface— Pneumatic Tube | 29 |
| Tube Seal Means | 30 |
| Tube Connector Means | 31 |
| Optical Fiber | 32 |
| Optical Fiber Conduit | 33 |

Figure 1:
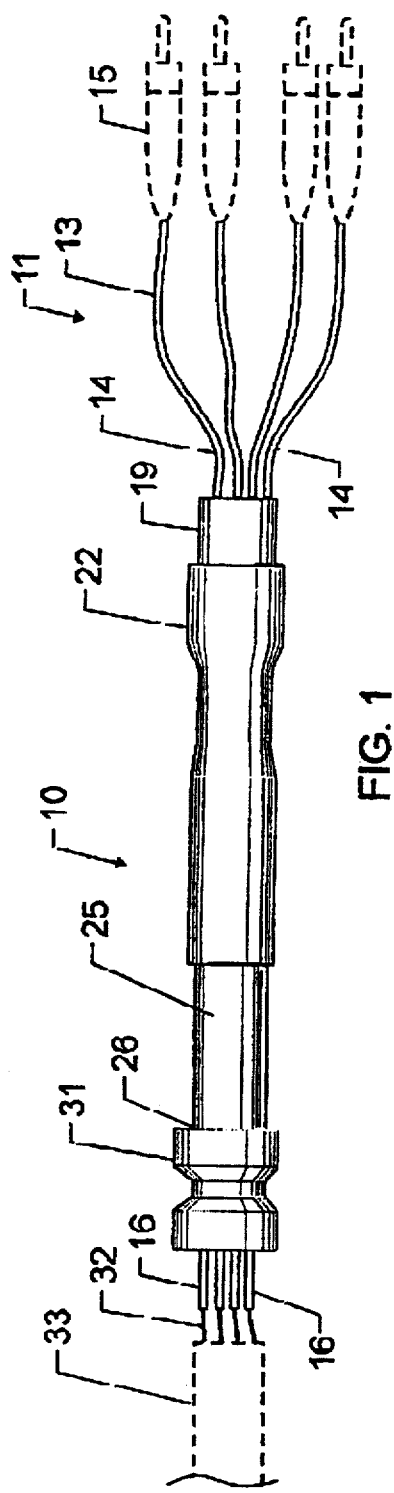
FIG. 1 is a view of the transition assembly of the present invention.

An overall view of a preferred embodiment of the transition assembly 10 of the present invention is shown in FIG. 1. The transition assembly 10 consists of: a furcation tube assembly 11; one or more furcation tubes 14; a pneumatic tube 25; a fastener such as a combination of an adhesive-lined heat shrink tube 22 and a non-adhesive-lined heat shrink tube 19 for attaching the furcation tube assembly 11 to the pneumatic tube 25. Each furcation tube 14 further comprises an inner tube 16. A tube connector means 31 connects the entrance end 26 of the pneumatic tube 25 to a conduit 33 (shown in phantom) containing at least one optical fiber 32. Prior art connectors 15, which are not part of the claimed invention, are shown in phantom as terminating at the exit end 13 of the furcation tube assembly 11.

Figure 2A:
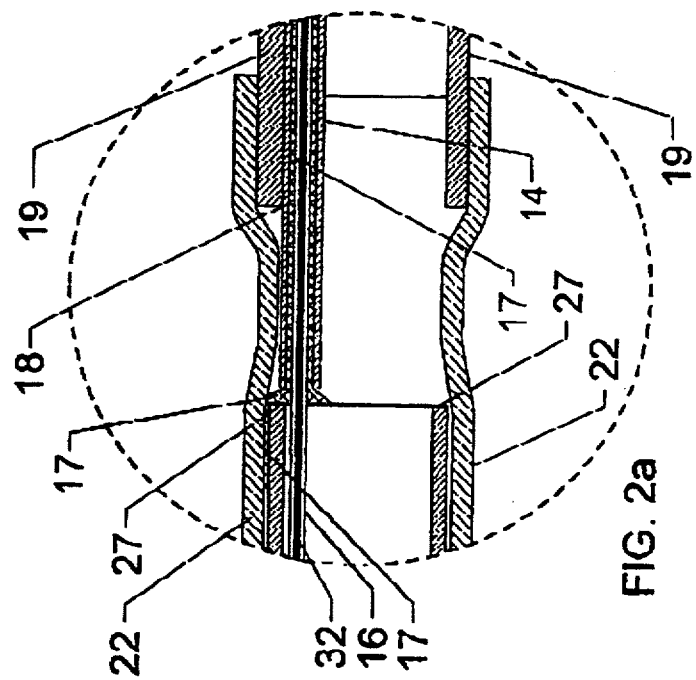
FIG. 2 is a sectional view of part of the transition assembly of the present invention with an exploded cut-away section (FIG. 2a).
Figure 2:
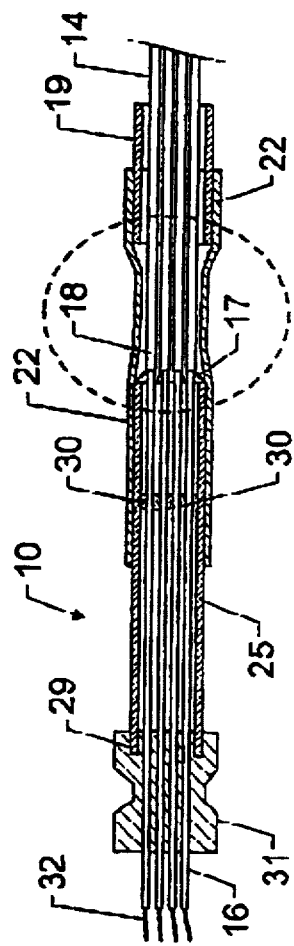

A sectional view of the transition assembly 10 with part enlarged is shown in FIGS. 2 and 2a. The parts of the transition assembly 10 not shown in FIG. 1, include a fibrous sheath 17 and an outer sheath 18 of the furcation tube 14, and a pneumatic tube seal 30. Referring back to FIG. 1, optical fibers 32 extend through the inner tubes 16, the pneumatic tube 25 and the furcation tube assembly 11 to the connectors 15. Note that for the sake of simplicity, only one furcation tube 14 is shown in the exploded view in the lower part of FIG. 2a.

FIG. 3 depicts the early fabrication steps of the transition assembly 10. The figure shows a furcation tube assembly 11 having two furcation tubes 14 extending from the entrance end 12 of the furcation tube assembly 11. Each furcation tube 14 consists of an inner tube 16 surrounded by a fibrous sheath 17; an outer sheath 18 surrounds the fibrous sheath 17. Each furcation tube 14 has a length of the outer sheath 18 removed to expose the fibrous sheath 17 which then has a length removed to expose the inner tube 16. Note that the inner tube 16 of the furcation tube 14 is referred to by some who are skilled in the art as a furcation tube but for clarity, is referred to here as an inner tube.

Any size tubing may be used for the inner tube 16 of the present invention. The dimensions of the inner tubing are dictated by the type of optical fiber connector used and the type or size of the optical fiber itself. In one instance, the inner tube 16 has a minimum interior diameter of about 600 microns and a maximum exterior diameter of about 950 microns. These dimensions may vary by about ±25 microns.

The fibrous sheath 17 is prepared from any material known to those skilled in the art. In the preferred embodiment it is prepared from a polyamide fiber such as KEVLAR® which is commercially available from E.I. duPont de Nemours & Co. Inc.

The outer sheath 18 is preferably of a polymeric coating material which has low smoke, zero halogen properties and is either a thermoset or a thermoplastic. For further illustration, FIG. 3 shows an optical fiber 32 disposed within the inner tube 16 of each furcation tube 14.

In FIG. 4, the next step in the fabrication process is shown where a pneumatic tube 25 has been provided. Any pneumatic tube 25 known to those skilled in the art may be used for the present invention. Such a pneumatic tube should be able to withstand exposure to high pressure and should be of a low smoke, low toxicity material. The fibrous sheath 17 of the upper furcation tube 14 is splayed backward to overlap a length of the furcation tube 14. The lower furcation tube 14 of the furcation tube assembly 11 is shown having the fibrous sheath 17 splayed forward to overlap a length of the exterior surface 29 of the exit end 27 of the pneumatic tube 25. Although the fibrous sheaths 17 are shown as going in two different directions, this is for illustration only and not typically done when practicing the invention. When practicing the invention, the fibrous sheaths 17 for all of the furcation tubes 14 will usually be splayed either all forward or all backward. The exposed inner tube 16 is extended through the pneumatic tube 25 along the interior surface 28 of the pneumatic tube 25 from the exit end 27 to the entrance end 26 where the inner tube 16 extends therefrom.

FIGS. 5–7 show preferred methods for attaching the entrance end 12 of the furcation tube assembly 11 to the exit end 27 of the pneumatic tube 25 using an adhesive-lined heat shrink tube 22 or a non-adhesive-lined heat shrink tube 19 in combination with an adhesive-lined heat shrink tube 22. It should be noted that any fastener known to those skilled in the art may be used to attach the furcation tube assembly 11 to the pneumatic tube 25 and examples of other fasteners include but are not limited to: a metal box, a mechanical fastener, an electrical tape, a glue, a plastic box, and a polymeric adhesive or any combination thereof. The entrance end 12 of the furcation tube assembly 11 is placed in an operable relationship to the exit end 27 of the pneumatic tube 25. For the sake of simplicity, only one furcation tube is shown in FIGS. 5–7, whereas four are shown in FIGS. 1, 2 (only one in the enlarged view) and 8, and two are shown in FIGS. 3 and 4.

Refer now to FIG. 5 where only an adhesive-lined heat shrink tube 22 serves as the fastener. The adhesive-lined heat shrink tube 22 has an entrance end 23 which overlaps a length of the exterior surface 29 of the exit end 27 of the pneumatic tube 25. The exit end 24 of the adhesive-lined heat shrink tube 22 overlaps the entrance end 12 of the furcation tube assembly 11 shown having the exposed fibrous sheath 17 splayed backward to overlap the furcation tube 14. The adhesive-lined heat shrink tube 22 is heated to shrink it to a secure fit. This bonds the pneumatic tube 25 to the furcation tube assembly 11 to prevent accidental detachment while in use. Alternatively, a non-adhesive-lined heat shrink tube (not shown in FIG. 5) may be substituted for the adhesive-lined heat shrink tube.

Since adhesive-lined heat shrink tubing is more rigid than non-adhesive-lined heat shrink tubing, it may be desirable to use non-adhesive-lined heat shrink tubing in combination with adhesive-lined heat shrink tubing as a fastening means as shown in FIG. 6. This allows for flexibility at the junction between the exit end 27 of the pneumatic tube 25 and the entrance end 12 of the furcation tube assembly 11 and minimizes breakage of the optical fiber. The non-adhesive-lined heat shrink tube 19 is cut to a length and overlaps a length of the furcation tube assembly 11. The non-adhesive-lined heat shrink tube 19 is heated to shrink it to a secure fit around the furcation tube assembly 11. The adhesive-lined heat shrink tube 22 is disposed so that its entrance end 23 overlaps the exit end 27 of the pneumatic tube 25 and its exit end 24 overlaps the entrance end 12 of the furcation tube assembly 11 with the exposed fibrous sheath 17, and the entrance end 20 of the non-adhesive-lined heat shrink tube 19. The adhesive-lined heat shrink tube 22 is heated to shrink it to a secure fit around the pneumatic tube 25, the exposed fibrous sheath 17, and the non-adhesive-lined heat shrink tube 19. FIG. 7 shows a similar application to FIG. 6, where a combination of heat shrink tubes is used. However, the main difference between FIG. 6 and FIG. 7 is the placement of the exposed fibrous sheath 17. In FIG. 7 the exposed fibrous sheath 17 is splayed forward over the exterior surface of the exit end 27 of the pneumatic tube 25. In this case, the entrance end 20 of the non-adhesive-lined heat shrink tube 19 may be extended to overlap the entrance end 12 of the furcation tube assembly 11.

A tube seal means 30 is disposed within the pneumatic tube 25 as shown in FIGS. 2, 5, 6, 7, and 8. FIG. 8 shows the tube seal means 30 in cross-section. The position of the tube seal means is shown in the figures in the preferred location, near the exit end 27 of the pneumatic tube 25. However it may be placed anywhere within the pneumatic tube 25. The tube seal means 30 seals the interior surface 28 of the pneumatic tube 25 to the inner tube 16 to prevent fluid flow through the pneumatic tube 25. Such prevention is necessary for marine or buried cable operations where possible water leakage may occur. Any means known to those skilled in the art for sealing a tube may be used. Such means include: a room temperature vulcanized (RTV) silicone; a pipe joint compound; a rubber; and a polymer gel. Preferably, the sealing means is an RTV silicone.

FIGS. 1 and 2 show that the transition assembly 10 further comprises a tube connector means 31. The tube connector means 31 is attached to the exterior surface 29 of the entrance end 26 of the pneumatic tube 25 to allow for attachment of the pneumatic tube 25 to a conduit 33 containing an optical fiber 32. The inner tube 16 extends through the tube connector means 31. Any tube connector means known to those skilled in the art may be used. The tube connector means may be a pneumatic connector; a mechanical fastening device; or a plastic-bodied, push-fit pneumatic connector. Preferably, the tube connector means is a plastic-bodied, push-fit pneumatic connector known as a MICRODUCT™ connector which is commercially available from BICC Brand-Rex.

The transition assembly of this invention may be prepared by any of the described methods in the shop where conditions lend themselves to expeditious, fault-free assembly. At the job site in the field, optical fibers 32 will be extending from the end of conduit 33 in which they have been installed. These fibers 32 are fed into the inner tubes 16 extending from the entrance end of the transition assembly 10 and through the transition assembly 10 until they extend from the ends of the furcation tubes 14 at the exit end of the transition assembly 10.

The conduit 33 is then connected to the tube connector means 31 at the entrance end of the transition assembly 10.

The fibers 32 extending from the furcation tubes 14 at the exit end of the transition assembly 10 are attached to prior art connectors 15 using standard methods.

The benefits of this invention are self-evident in the fact that the installation may easily be accomplished in a very short time and damage to the optical fiber is minimized. The following example illustrates the fabrication of the transition assembly. This example is merely illustrative and intended to enable those skilled in the art to practice the invention in all of the embodiments flowing therefrom, and does not in any way limit the scope of the invention as defined by the claims.

EXAMPLE

Fabrication of the Transition Assembly

A length of 8 mm pneumatic tubing having the same material properties as that of the tubing used for blowing in optical fiber was provided. A furcation tube assembly was also provided. The furcation tube assembly comprised four furcation tubes. Each furcation tube consisted of an inner tube, a layer of KEVLAR® fibers, which is commercially available from E.I. duPont de Nemours & Company, Inc., surrounding it and a protective sheath surrounding the KEVLAR® fibers. Before the furcation tube was inserted into the pneumatic tube, a portion of the protective sheath was removed along with a portion of the KEVLAR® fibers to expose the inner tubes. A non-adhesive-lined heat shrink tube was placed over the entrance end of the furcation tube assembly. The exposed inner tubes were fed through the pneumatic tube to the entrance end where they extended approximately two inches beyond the entrance end of the pneumatic tube. A tube seal consisting of RTV silicone was injected into the pneumatic tube. The exposed KEVLAR® fibers were splayed over the outside of the pneumatic tube. The non-adhesive-lined heat shrink tube was heated to shrink it to a secure fit around the furcation tube assembly. An adhesive-lined heat shrink tube was placed over the KEVLAR® fibers and the pneumatic tube, and over the end of the non-adhesive-lined heat shrink tubing; it was then shrunk to a secure fit around the pneumatic tube, the furcation tube assembly, and the non-adhesive-lined heat shrink tubing. A pneumatic tube connector was attached to the entrance end of the pneumatic tube. The optical fiber was fed through the exposed inner tube and was allowed to extend through the end of the furcation tube assembly. The tube connector was joined to the pneumatic tube of the optical fiber circuit. Lastly, a Mil-spec ST connector was attached to each optical fiber and each furcation tube in the furcation tube assembly using standard methods known to those skilled in the art.

What is claimed is:

1. A transition assembly for optical fiber, the transition assembly comprising:

a pneumatic tube having a longitudinal axis, an entrance end, an exit end, an interior surface and an exterior surface;

a furcation tube assembly having an entrance end and an exit end, the entrance end of the furcation tube assembly placed in an operable relationship to the exit end of the pneumatic tube and attached to the exit end of the pneumatic tube with a fastener; the furcation tube assembly comprising at least one furcation tube, each furcation tube having an inner tube, a fibrous sheath surrounding the inner tube, and an outer sheath surrounding the fibrous sheath; and at least one furcation tube extending from the entrance end of the furcation tube assembly, each furcation tube having a length of the outer sheath removed to expose the fibrous sheath and the inner tube; and wherein the exposed inner tube is disposed within the exit end of the pneumatic tube, extends along the longitudinal axis of the pneumatic tube, and protrudes from the entrance end of the pneumatic tube.

2. The transition assembly for optical fiber according to claim 1, wherein the fastener is a member selected from the group consisting of: a metal box; a non-adhesive-lined heat shrink tube; an adhesive-lined heat shrink tube; a mechanical fastener; an electrical tape; a glue; a plastic box; and a polymeric adhesive.

3. The transition assembly for optical fiber according to claim 2, wherein the fastener is an adhesive-lined heat shrink tube having an entrance end and an exit end, the entrance end of the adhesive-lined heat shrink tube overlapping a length of the exterior surface of the exit end of the pneumatic tube and the exit end of the adhesive-lined heat shrink tube overlapping a length of the entrance end of the furcation tube assembly.

4. The transition assembly for optical fiber according to claim 3, further comprising a non-adhesive-lined heat shrink tube having an entrance end and an exit end wherein the non-adhesive-lined heat shrink tube overlaps a length of the furcation tube assembly and wherein the entrance end of the non-adhesive-lined heat shrink tube is disposed within a length of the exit end of the adhesive-lined heat shrink tube.

5. The transition assembly for optical fiber according to claim 1, wherein a length of the exposed fibrous sheath is splayed backward to overlap a length of the furcation tube.

6. The transition assembly for optical fiber according to claim 5, wherein the fastener is an adhesive-lined heat shrink tube having an entrance end overlapping a length of the exit end of the pneumatic tube and an exit end overlapping the exposed fibrous sheath and a length of the furcation tube assembly.

7. The transition assembly for optical fiber according to claim 6, further comprising a non-adhesive-lined heat shrink tube having an entrance end and an exit end wherein the non-adhesive-lined heat shrink tube overlaps a length of the furcation tube assembly and wherein the entrance end of the non-adhesive-lined heat shrink tube is disposed within a length of the exit end of the adhesive-lined heat shrink tube.

8. The transition assembly for optical fiber according to claim 1, wherein a length of the exposed fibrous sheath is splayed forward to overlap a length of the exterior surface of the exit end of the pneumatic tube.

9. The transition assembly for optical fiber according to claim 8, wherein the fastener is an adhesive-lined heat shrink tube having an entrance end overlapping a length of the exit end of the pneumatic tube and the exposed fibrous sheath, and an exit end overlapping a length of the furcation tube assembly.

10. The transition assembly for optical fiber according to claim 8, wherein the fastener comprises a non-adhesive-lined heat shrink tube overlapping a length of the furcation tube assembly; and an adhesive-lined heat shrink tube having an entrance end overlapping a length of the exit end of the pneumatic tube and the exposed fibrous sheath, and an exit end overlapping a length of the non-adhesive-lined heat shrink tube.

11. The transition assembly for optical fiber according to claim 1, further comprising a tube seal means for sealing the inner tube to the interior surface of the pneumatic tube.

12. The transition assembly for optical fiber according to claim 11, wherein the tube seal means is selected from the group consisting of: an RTV silicone; a pipe joint compound; a rubber; and a polymer gel.

13. The transition assembly for optical fiber according to claim 12, wherein the tube seal means is an RTV silicone.

14. The transition assembly for optical fiber according to claim 1, further comprising a tube connector means for attachment of the entrance end of the pneumatic tube to a conduit containing at least one optical fiber wherein the tube connector means is attached to the exterior surface of the entrance end of the pneumatic tube.

15. The transition assembly for optical fiber according to claim 14, wherein the tube connector means is a member selected from the group consisting of: a pneumatic connector; a mechanical fastening device; and a plastic-bodied, push-fit pneumatic connector.

16. The transition assembly for optical fiber according to claim 1, wherein the fibrous sheath is prepared from a polyamide fiber.

17. The transition assembly for optical fiber according to claim 1, further comprising at least one optical fiber extending from a conduit, wherein each optical fiber extends through the exposed inner tube protruding from the entrance end of the pneumatic tube, along the longitudinal axis of the pneumatic tube, and through the furcation tube assembly to a connector.

18. A transition assembly for optical fiber, the transition assembly comprising:

a pneumatic tube having a longitudinal axis, an entrance end, an exit end, an interior surface and an exterior surface;

a furcation tube assembly having an entrance end and an exit end, the entrance end of the furcation tube assembly placed in an operable relationship to the exit end of the pneumatic tube; the furcation tube assembly comprising at least one furcation tube, each furcation tube having an inner tube, a polyamide fiber sheath surrounding the inner tube, and an outer sheath surrounding the polyamide fiber sheath; and at least one furcation tube extending from the entrance end of the furcation tube assembly, the furcation tube having a length of the outer sheath removed to expose the polyamide fiber sheath and the inner tube; wherein the exposed inner tube is disposed within the exit end of the pneumatic tube, extends along the longitudinal axis of the pneumatic tube, and protrudes from the entrance end of the pneumatic tube; and wherein a length of the exposed polyamide fiber sheath overlaps the exterior surface of the exit end of the pneumatic tube;

a non-adhesive-lined heat shrink tube overlapping a length of the furcation tube assembly;

an adhesive-lined heat shrink tube having an entrance end overlapping a length of the exit end of the pneumatic tube and the exposed polyamide fiber sheath; and an exit end overlapping a length of the non-adhesive-lined heat shrink tube;

an RTV silicone tube seal disposed within the pneumatic tube and sealing the exposed inner tube to the interior surface of the pneumatic tube; and a plastic-bodied, push-fit pneumatic connector attached to the exterior surface of the entrance end of the pneumatic tube through which the exposed inner tube extends.

19. A method for preparing a transition assembly for optical fiber, the method comprising the steps of:

providing a furcation tube assembly having an entrance end and an exit end, the furcation tube assembly comprising at least one furcation tube, each furcation tube having an inner tube, a fibrous sheath surrounding the inner tube, and an outer sheath surrounding the fibrous sheath;

extending at least one furcation tube from the entrance end of the furcation tube assembly;

removing the outer sheath from a length of each extended furcation tube to expose the fibrous sheath and the inner tube;

providing a pneumatic tube having an entrance end, an exit end, an interior surface, an exterior surface, and a longitudinal axis;

extending the exposed inner tube through the exit end of the pneumatic tube, along the longitudinal axis of the pneumatic tube, and out of the entrance end of the pneumatic tube; and attaching the entrance end of the furcation tube assembly to the exit end of the pneumatic tube.

20. The method according to claim 19, further comprising the step of attaching a tube connector means for attaching the entrance end of the pneumatic tube to a conduit to the exterior surface of the entrance end of the pneumatic tube through which the inner tube extends.

21. The method according to claim 19, further comprising the step of applying a tube seal to the interior surface of the pneumatic tube.

22. The method according to claim 19, wherein the entrance end of the furcation tube assembly is attached to the exit end of the pneumatic tube by splaying a length of the exposed fibrous sheath over the exterior surface of the exit end of the pneumatic tube; providing an adhesive-lined heat shrink tube having an entrance end and an exit end; overlapping a length of the exit end of the pneumatic tube and the exposed fibrous sheath with the entrance end of the adhesive-lined heat shrink tube; overlapping the entrance end of the furcation tube assembly with the exit end of the adhesive-lined heat shrink tube; and heating the adhesive-lined heat shrink tube to shrink to a secure fit.

23. The method according to claim 19, wherein the entrance end of the furcation tube assembly is attached to the exit end of the pneumatic tube by splaying a length of the exposed fibrous sheath backward over each furcation tube; providing an adhesive-lined heat shrink tube having an entrance end and exit end; overlapping a length of the exit end of the pneumatic tube with the entrance end of the adhesive-lined heat shrink tube; overlapping the entrance end of the furcation tube assembly and the exposed fibrous sheath with the exit end of the adhesive-lined heat shrink tube; and heating the adhesive-lined heat shrink tube to shrink to a secure fit.

24. The method according to claim 19, wherein the entrance end of the furcation tube assembly is attached to the exit end of the pneumatic tube by splaying a length of each exposed fibrous sheath over the exterior surface of the exit end of the pneumatic tube; providing an adhesive-lined heat shrink tube and a non-adhesive-lined heat shrink tube, each heat shrink tube having an entrance end and an exit end; overlapping a length of the furcation tube assembly with the non-adhesive-lined heat shrink tube and heating the non-adhesive-lined heat shrink tube to shrink to a secure fit; overlapping the exit end of the pneumatic tube having the exposed fibrous sheath with the entrance end of the adhesive-lined heat shrink tube and overlapping the entrance end of the non-adhesive-lined heat shrink tube with the exit end of the adhesive-lined heat shrink tube; and heating the adhesive-lined heat shrink tube to shrink to a secure fit.

25. The method according to claim 19, wherein the entrance end of the furcation tube assembly is attached to the exit end of the pneumatic tube by splaying a length of each exposed fibrous sheath backward over a length of each furcation tube; providing an adhesive-lined heat shrink tube and a non-adhesive lined heat shrink tube, each heat shrink tube having an entrance end and an exit end; overlapping a length of the furcation tube assembly with the non-adhesive-lined heat shrink tube and heating the non-adhesive-lined heat shrink tube to shrink to a secure fit; overlapping a length of the exterior surface of the exit end of the pneumatic tube and the exposed fibrous sheath with the entrance end of the adhesive-lined heat shrink tube and overlapping the entrance end of the non-adhesive-lined heat shrink tube with the exit end of the adhesive-lined heat shrink tube; and heating the adhesive-lined heat shrink tube to shrink to a secure fit.

26. A method for preparing a transition assembly for optical fiber, the method comprising the steps of:

providing a furcation tube assembly having an entrance end and an exit end, the furcation tube assembly comprising at least one furcation tube, each furcation tube having an inner tube, a polyamide fiber sheath surrounding the inner tube, and an outer sheath surrounding the polyamide fiber sheath;

extending at least one furcation tube from the entrance end of the furcation tube assembly;

removing the outer sheath from a length of the extended furcation tube, exposing the inner tube and the polyamide fiber sheath;

providing a pneumatic tube having an entrance end, an exit end, an interior surface, an exterior surface, and a longitudinal axis;

extending the exposed inner tube through the exit end of the pneumatic tube, along the longitudinal axis of the pneumatic tube, and out of the entrance end of the pneumatic tube;

attaching the entrance end of the furcation tube assembly to the exit end of the pneumatic tube by splaying a length of the exposed polyamide fiber sheath over the exterior surface of the exit end of the pneumatic tube; providing an adhesive-lined heat shrink tube and a non-adhesive-lined heat shrink tube, each heat shrink tube having an entrance end and an exit end; overlapping a length of the furcation tube assembly with the non-adhesive-lined heat shrink tube and heating the non-adhesive-lined heat shrink tube to shrink to a secure fit; overlapping the exit end of the pneumatic tube and the exposed polyamide fiber sheath with the entrance end of the adhesive-lined heat shrink tube and overlapping a length of the entrance end of the non-adhesive-lined heat shrink tube with the exit end of the adhesive-lined heat shrink tube; and heating the adhesive-lined heat shrink tube to shrink to a secure fit;

applying an RTV silicone tube seal to the interior surface of the pneumatic tube; and attaching a plastic-bodied, push-fit pneumatic connector to the exterior surface of the entrance end of the pneumatic tube through which the inner tube extends.

* * * * *

UNITED STATES PATENT AND TRADEMARK OFFICE
CERTIFICATE OF CORRECTION

PATENT NO : 5,838,861

DATED : Nov. 17, 1998

INVENTOR(S): Todd A. Bunde

It is certified that error appears in the above-identified patent and that said Letters Patent is hereby corrected as shown below:

In the drawings, sheet 1, FIG. 2, the enlarged cutaway section should be labeled as FIG. 2A. as shown on the attached page.

Signed and Sealed this

Thirtieth Day of March, 1999

*Attest:*

Q. TODD DICKINSON

*Attesting Officer*     Acting Commissioner of Patents and Trademarks